(12) United States Patent
Paila et al.

(10) Patent No.: US 8,032,127 B2
(45) Date of Patent: *Oct. 4, 2011

(54) ANNOUNCING INFORMATION SERVICE THROUGH BROADCASTING OR MULTICASTING

(75) Inventors: Toni Paila, Degerby (FI); Miia Vainio, Espoo (FI); Harri Hakulinen, Pirkkala (FI)

(73) Assignee: Nokia Corporation, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 12/648,814

(22) Filed: Dec. 29, 2009

(65) Prior Publication Data

US 2010/0105314 A1 Apr. 29, 2010

Related U.S. Application Data

(63) Continuation of application No. 10/521,110, filed as application No. PCT/IB03/03016 on Jul. 9, 2003, now Pat. No. 7,664,063.

(30) Foreign Application Priority Data

Jul. 12, 2002 (GB) .................................. 0216240.2

(51) Int. Cl.
  *H04H 20/71* (2008.01)
  *H04L 29/06* (2006.01)
  *H04M 3/42* (2006.01)
  *H04M 3/00* (2006.01)
  *H04W 4/00* (2009.01)

(52) U.S. Cl. ................. 455/414.3; 455/3.01; 455/414.1; 455/418; 370/312; 370/313

(58) Field of Classification Search .......... 370/310–314, 370/328–329, 338, 341, 349–350, 395.3, 370/395.52, 395.64, 395.5; 455/414.1–414.3, 455/418–420, 466, 509, 517, 561, 566, 3.01–3.06, 455/450, 550.1, 556.2; 709/203, 227–229, 709/219; 375/E7.011–E7.013; 725/44–46, 725/51; 713/163; 707/769–770, 778, 786

See application file for complete search history.

(56) References Cited

U.S. PATENT DOCUMENTS 4,541,093 A * 9/1985 Furuya et al. ................. 714/755

(Continued)

FOREIGN PATENT DOCUMENTS

EP 0 325 325 A2 7/1989
EP 0 957 598 A2 * 11/1999

(Continued)

OTHER PUBLICATIONS

PCT internation Search Report (as published), International Application No. PCT/IB2003/003016, Date of Completion of Search—Sep. 19, 2003.

(Continued)

*Primary Examiner* — Meless Zewdu
(74) *Attorney, Agent, or Firm* — Ditthavong Mori & Steiner, P.C.

(57) ABSTRACT

A receiver (FIG. 2) receives IP session announcement signals from a terrestrial digital video broadcasting system. Each IP session announcement (RM) includes information concerning announcements on an immediately lower level as well as information identifying the quantity of announcement data, such as the number of announcement messages, and a timeout value. The quantity data tells the receiver how many messages X1 to X3 it needs to receive (C) before it has received all the relevant announcement messages. The timeout value informs the receiver how long it can wait before again receiving the messages X1 to X3 (which may have changed in content by then). After initially receiving the messages X1 to X3, the receiver may sleep (E), or it may receive announcement messages from another channel Y (D).

30 Claims, 3 Drawing Sheets

U.S. PATENT DOCUMENTS

| | | | |
|---|---|---|---|
| 5,497,186 | A | 3/1996 | Kawasaki |
| 6,091,956 | A | 7/2000 | Hollenberg |
| 6,763,392 | B1 * | 7/2004 | del Val et al. ................. 709/231 |
| 6,771,639 | B1 * | 8/2004 | Holden ......................... 370/352 |
| 7,007,040 | B1 * | 2/2006 | Duke et al. ........................... 1/1 |
| 7,181,526 | B1 * | 2/2007 | Bell et al. ...................... 709/231 |
| 7,330,693 | B1 * | 2/2008 | Goss ............................ 455/3.01 |
| 7,441,014 | B1 * | 10/2008 | Bulkowski .................... 709/218 |
| 7,664,063 | B2 * | 2/2010 | Paila et al. .................... 370/312 |
| 2003/0147390 | A1 * | 8/2003 | Rizzo et al. ................... 370/390 |
| 2003/0157949 | A1 * | 8/2003 | Sarkkinen et al. ............ 455/503 |

FOREIGN PATENT DOCUMENTS

| | | |
|---|---|---|
| WO | WO 00/36804 | 6/2000 |
| WO | WO 01/37082 A1 | 5/2001 |
| WO | WO 01/82783 A2 | 11/2001 |
| WO | WO 01/99348 A1 | 12/2001 |

OTHER PUBLICATIONS

R. Finlayson, Describing session directories in SDP, Network Working Group, Jun. 21, 2000. Retrieved on Sep. 17, 2003 from Internet: http://www.ietf.org/proceedings/00dec/I-D/draft-ietf-mmusic-sdp-directory-type-01.txt.

UK Patent Office Search Report of priority UK Application No. GB 0216240.2, Date of Search: Jan. 23, 2003.

* cited by examiner

ANNOUNCING INFORMATION SERVICE THROUGH BROADCASTING OR MULTICASTING

RELATED APPLICATIONS

This application is a continuation of and claims priority to U.S. patent application Ser. No. 10/521,110, filed Jul. 12, 2005, which is a national phase application under 35 U.S.C. 371 of International Application PCT/IB03/03016, filed Jul. 9, 2003, and incorporated herein by reference in their entireties.

BACKGROUND

An Internet protocol (IP) service can include plural items delivered using an IP session. An IP session may include an IP stream carrying primary content, such as live or recorded music, and further IP streams carrying secondary content, such as error correction or song lyrics. Another example of an IP session is news, where a primary IP stream may carry audio data, with secondary streams carrying a video clip download and a web page push respectively. Such services can be broadcast using terrestrial digital video broadcast (DVB-T), but IP streams may instead be multicast or unicast.

A DVB transmission system usually provides a data rate of 10 Mbps or more. This provides a possibility to significantly reduce the average DVB receiver power consumption by using time-slicing, which is based on time division multiplexing (TDM). Time sliced data is sent in bursts using significantly higher bandwidth than the bandwidth required if the data was transmitted using static bandwidth. Within a burst, data is included indicating the time to the beginning of the next burst (delta-t). Between the bursts, service data is not transmitted, allowing other services to use the bandwidth. This enables a receiver to stay active for only a proportion of the time, whilst still receiving bursts of data for a requested service. If the mobile handheld terminal requires a lower constant bitrate, buffering the received bursts can provide this. Data is formatted by using, for example, a multi-protocol encapsulator in accordance with Section 7 of European Standard EN 301 192 "Digital Video Broadcasting (DVB); DVB specification for data broadcasting." The multi-protocol encapsulator sends encapsulated data to a digital broadcast transmitter for broadcast to the digital broadcast receiver as a time-sliced signal. The time sliced signal comprises a continuous series of transmission bursts.

A DVB-T receiver terminal is able to determine information about IP sessions from IP session announcements. Announcements are structured in a hierarchal manner.

At the lowest level, announcements in respect of a subcategory of information services may include a number of messages, each message having information describing the IP session, information descriptive of the content of the IP streams, information concerning the location (e.g. channel frequency, etc.) of the respective IP streams, information about schedules of sessions, and certain other parameters related to it. Above the lowest level, there are hierarchical levels of announcements, each level of which gives information only about announcements on an immediately lower level. The services typically are divided into different categories such that the highest (or root) level may include messages relating one-to-one to the categories of news, sport, entertainment, etc Announcements in the sport category may then consist of messages each relating to a different one of football, hockey, athletics, etc. There may be any number of levels of announcement. An IP session announcement can be made using a session description protocol (SDP) message, which forms part of a session announcement protocol (SAP) message.

It is common for an IP session announcement at one level in the hierarchy to be transmitted on a channel having a different frequency to a channel on which an IP session announcement on a lower level, for example an immediately lower level, is transmitted. This means that it is not usually possible for a terminal having a single radio receiver to receive announcements on different levels simultaneously.

Some Example Embodiments

According to a first aspect of the invention, there is provided a method of operating broadcast or multicast apparatus, the method comprising: controlling the apparatus to broadcast or multicast, in respect of one or more announcements on a lower level and relating to a category of an information service, data indicating a category to which the announcements relate, and data indicating the quantity of announcement information transmitted in respect of the lower level.

According to a second aspect of the invention, there is provided an information service broadcaster or multicaster arranged to produce for broadcasting or multicasting data indicating a category to which one or more announcements on d lower level and relating to information service belong and data indicating the quantity of announcement information transmitted in respect of the lower level announcements.

According to a third aspect of the invention, there is provided a method of operating a receiver, the method comprising: receiving via a receiver announcement data indicating a category to which one or more announcements on a lower level and relating to an information service belong, and quantity data indicating the quantity of announcement information transmitted in respect of the lower level announcements; and controlling the receiver to receive announcement data for a period of time dependent at least in part on the quantity data.

According to a fourth aspect of the invention, there is provided a receiver for receiving announcement data indicating a category to which one or more announcements on a lower layer and relating to an information service belong and quantity data indicating the quantity of announcement information transmitted in respect of the lower level announcements; and arranged to receive announcement data for a period of time dependent at least in part on the quantity data.

According to a fifth aspect of the invention, there is provided a user interface, useable with an electronic program or service guide, the user interface comprising: a receiver module arranged to receive data indicating a category to which one or more announcements on a lower level and relating to an information service belong, and quantity data indicating the quantity of announcement information transmitted in respect of the lower level announcements, and a display module arranged to display a number of category options, which options are selectable by a user, the number of category options being dependent at least in part on the quantity data.

Advantages which may ensue from the inclusion of the quantity information are generally experienced at the receiver end. In particular, knowing how long the receiver needs to receive announcement information, for allows it to save resources, most notably power supply and radio receiver resources. Resource saving can be optimised if timeout information is also available.

Embodiments of the invention will now be described, by way of example only, with reference to the accompanying drawings.

DESCRIPTION OF SOME EMBODIMENTS

Figure 1:
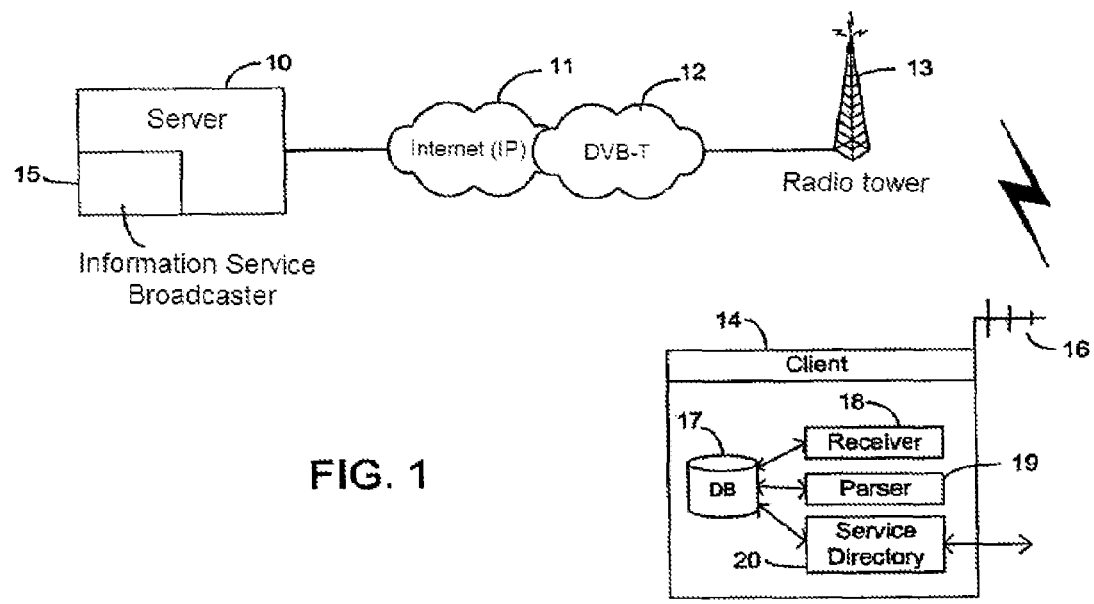
FIG. 1 is a diagram of a broadcast system including components according to various aspects of the invention.

Referring to FIG. 1, a broadcast system according to an embodiment of the invention is shown, comprising generally a broadcast server apparatus 10, the internet 11, a DVB-T system 12, a radio transmitter tower 13 and a client receiver terminal 14. The broadcast server 10 includes an information service broadcaster 15, which includes software for generating IP streams and corresponding IP session announcements at plural levels, as SAP messages. The IP streams may be conventional which are not described in further detail here. In another embodiment of the invention the IP streams may also be so-called IP datacast bursts using time-slicing. According to the invention, though, the IP session announcements are unconventional. When time-slicing is used, the session announcements are substantially similar to the conventional session announcements. Except for the lowest level IP session announcements, each IP session announcement generated by the information service broadcaster 15 includes information identifying the IP destination address and the port at which location SAP messages announcements on a level below the current level can be found. Typically, this is a level immediately below the current level, but this is not necessary. Also, announcements can be in respect of plural lower levels, which may or may not include the immediately lower level. Each IP session announcement also includes a message identifier hash field of the SAP message, and the category or subcategory to which the information service relates. The message identifier hash fields each include a hash value, which uniquely identifies the message with the originating source address. Each announcement also includes information identifying the number of messages on the lower level and relating to that category, and a timeout value. The timeout value may be set at a value dependent on, for example equal to, the minimum time between updates in the lower level messages. Also included are the starting and stopping times of the sending of the service and the transport format, for example sap sdp Announcement messages at the lowest level give the transport protocol (e.g. RTP/UDP/IP) and the format of the media.

The IP session announcements may describe the above listed information in any convenient manner. For example, the 'count' and timeout' parameters could be included in the "cat" attribute of an SDP message, e.g. "a=cat: x. y. z 10 20" means pointer to category "x.y.z" with 'count' 10 and 'timeout' 20. Alternatively, this information could be included in an SDP media field "m", e.g. as "m=application 9889 sap sdp 10 20".

The IP streams and IP session announcements at all levels generated by the information service broadcaster 15 are provided by the server 10 and via the internet 11 to the DVB-T system 12. Here, the IP streams and IP session announcements are prepared before being broadcast by the radio transmitter tower 13. The terminal receiver 14, which in this example is a terrestrial digital receiver, receives IP session announcements via an antenna 16. The receiver includes a database 17, a receiver device 18, a parser device 19 and a service directory 20, which contains information about the different categories which are shown to a user and information concerning where announcements relating to the categories can be found.

Operation of the client receiver 14 is as follows. IP session announcements are received, and the category information thereof is examined for announcements relating to a required information service or category. The identity of the information service that is required is entered by a user and stored in the database. When an IP session announcement relating to the required category is found, the information it contains is stored locally. From the stored announcement, the client receiver 14 determines the IP address and port of announcements at a lower level, typically a level immediately below, and directs the receiver 18 to that location. The announcement may contain the IP address and port information, or it may be that information included in the announcement is combined with mapping information to obtain the physical and logical channel (location) required. Receiving SAP messages from that IP address and port, the client receiver 14 receives and stores a number of messages equal to the number given in the IP session announcement of the higher level, typically the level immediately above, after which it starts a timer (not shown) and ceases receiving. Here, only messages related to the required category are stored. Moreover, the hash values from the message identifier hash fields are examined along with the originating source addresses to ensure that each of the different messages is received and stored. If the hash values were not checked, messages could be missed if, for example, the messages are transmitted in a non-repeating sequence. Once the timer reaches a value equal in seconds to the timeout value included in the relevant IP session announcement, the receiver again receives SAP messages from the IP address and port identified in the higher level IP session announcement.

In this way, the receiver 18 is enabled to receive SAP messages for a time sufficient to receive all of the messages that are included thereon, and does not receive any messages again until after a time dependent on the timeout value has lapsed. Thus, the receiver 18 is enabled for receiving announcement messages on that level of hierarchy only intermittently.

Announcements on lower levels which relate to announcements rather than IP streams are handled in a substantially the same manner, although relating instead to messages concerned with a required sub-category, rather than category. An alternative form of client receiver is shown in FIG. 2.

Figure 2:
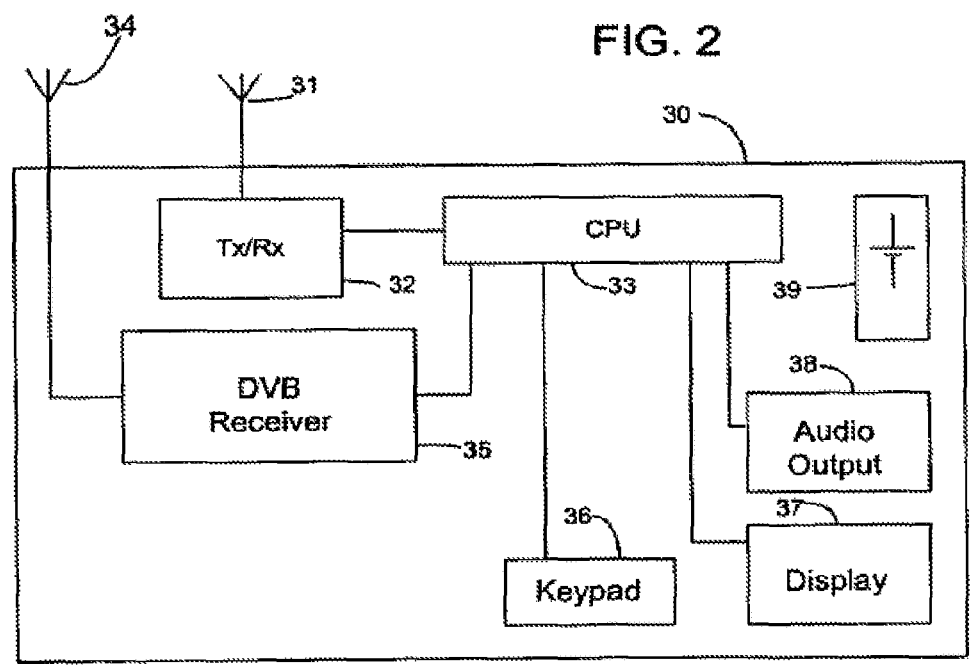
FIG. 2 is a schematic diagram of a receiver according to one aspect of the invention.

Referring to FIG. 2, a client receiver, in the form of a handheld terminal 30, is shown, the terminal comprising generally a first antenna 31, a DVB antenna 34, a transceiver 32, a DVB receiver 35 for receiving DVB transmissions, a central processing unit (CPU) 33 and a power source, preferably in the form of rechargeable battery. The transceiver 32 is connected to the first antenna 31 and to the CPU 33. The DVB receiver 35 is connected to the DVB antenna 34. Also connected to the CPU 33 are the DVB receiver 35, a keypad 36, a display 37 and an audio output means 38. A user interface is constituted by various parts of the terminal, particularly the DVB receiver 35, the CPU 33 and the display 37. The terminal 30 also includes other conventional features of mobile telephone handsets, but these are omitted from FIG. 2 for the sake of clarity.

The identity of an information service with which a user is interested is entered via the keypad 36. Of course, entry may be made in any other convenient manner, such as through voice commands or through a touch-screen (not shown). The CPU 33 then controls the transceiver 32 and the DVB receiver 35 to find and to receive IP session announcements corresponding to the required information service. Once announcement information relating to the required category has been received, the CPU 33 controls the transceiver 32 and the DVB receiver 35 to receive messages on a lower level of announcements.

In some circumstances, the CPU 33 may determine that further user input is required, for example, to select which, if any, of the available subcategories or IP streams is of interest. Here, the available subcategories or streams are displayed using the display 37 and/or announced using the audio output 38, and a user selection input is awaited. In this case, the CPU 33 exerts control so that the appropriate IP session announcements or IP streams are not received until a user selection has been made, which results in a saving of battery power. However, the DVB receiver 35 is controlled to continue receiving IP session announcements at the highest level either continuously or intermittently/in case there is a change in that information service. The number of announcement messages available is determined, by the DVB receiver 35 by examining the information identifying the number of messages on the channel. Any change is reflected in the displayed and/or announced options.

An example of the way in which the receiver and the terminal 30 may operate in response to received IP session announcements is described with reference to FIG. 3. The FIG. 2 receiver is referred to for ease of explanation.

Figure 3:
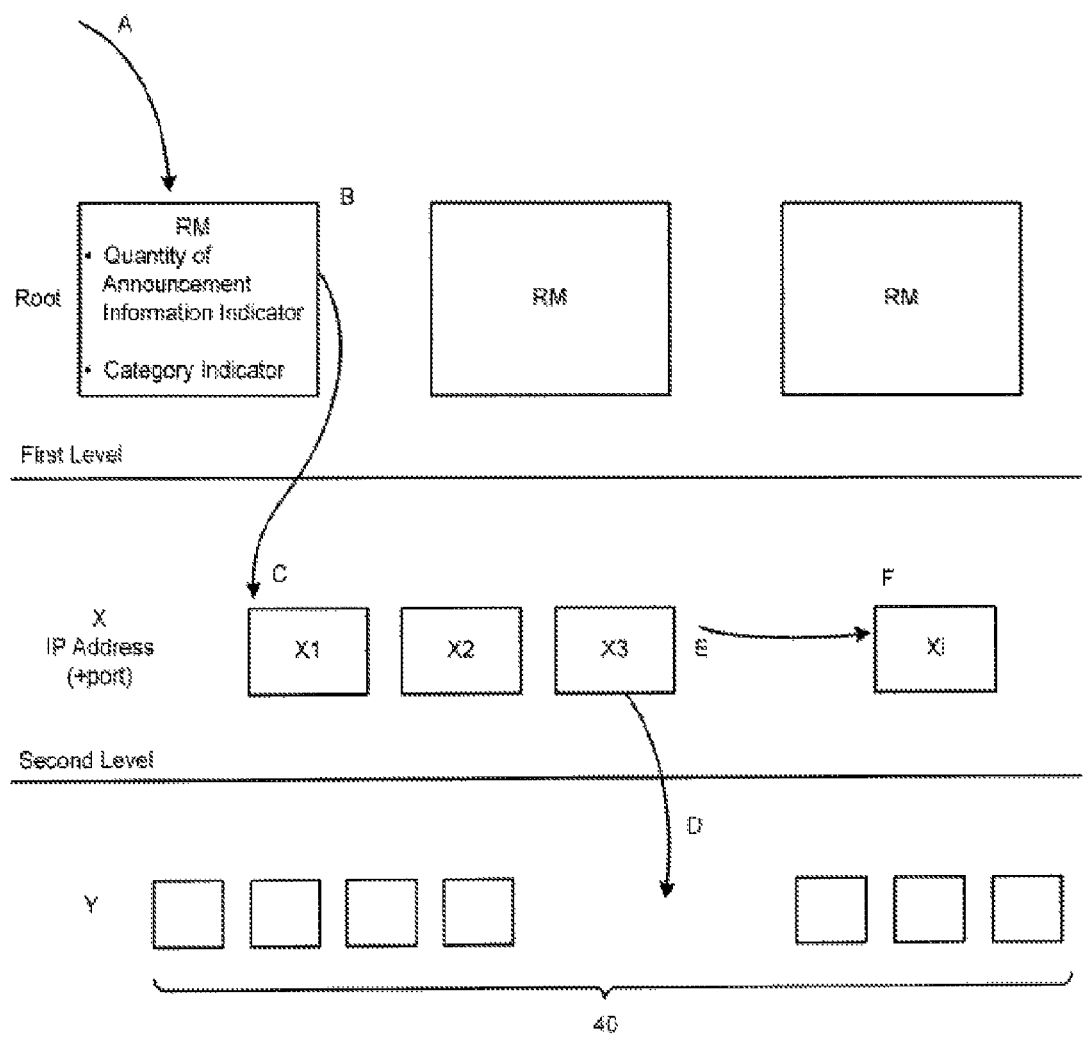
FIG. 3 is a schematic diagram illustrating operation of the receiver of FIG. 2.

Referring to FIG. 3, the terminal 30 starts at A by controlling its DVB receiver 35 to receive a root level message RM, i.e. a highest level IP session announcement, corresponding to the required category. The message RM includes all the information about the announcements on a lower level, typically the level immediately below the root level, as described above with reference to FIG. 1.

From the root message RM, the terminal 30 determines at step B that its DVB receiver 35 should receive announcement messages from channel X having a now known IP address and port, and controls the transceiver 32, as well as the receiver, accordingly. The terminal 30 also knows from the root message RM that there are three different messages on the channel X and that the timeout value is fifteen seconds. At step C, the DVB receiver 35 then receives three announcement messages, in the form of messages X1, X2 and X3, before ceasing receiving messages. It will be understood that channel X may be on the same or a different physical channel to that on which the root message RM is transmitted, and that it may be a different multicast group.

After ceasing receiving, the DVB receiver 35 may at step D and during its timeout period, listen to messages on another channel Y, which carries announcement messages Y1, Y2, Y3, Y4 ... Yi, Yj, Yk concerning one or more of the subcategories to which the messages on channel X relate. Alternatively, the DVB receiver 35 may sleep at step E before again receiving the messages on channel X, at step F. To ensure full integrity of the received messages, the DVB receiver 35 may perform recursive rescan at, the end of the timeout period of step E.

In other embodiments (not shown), the quantity of data included on the IP session announcements on a level immediately below a current level is defined in the IP session announcements on the higher level in terms other than by the number of messages, for example in terms of the duration of the data transmission or in terms of the quantity (in bytes) of data.

Other forms of terminal 30 are possible. With the example given, the terminal 30 may be any one with DVB baseband capability, such as a suitably equipped laptop computer. Where a network other than DVB-T is used, the terminal 30 may take any suitable form, such as a personal digital assistant (PDA), or a portable sound reproduction device, such as a personal stereo. Alternatively, the receiver could be a wireless local area network (WLAN) module.

In alternative embodiments, the announcements may be sent with UHTTP, instead of with SAP, with attachment/content of MMS or e-mail, or with HTTP response.

UHTTP has the advantage that it can include many SDP messages. Also, XML, RDF or any other suitable structured language could be used in place of SDP.

Figure 4:
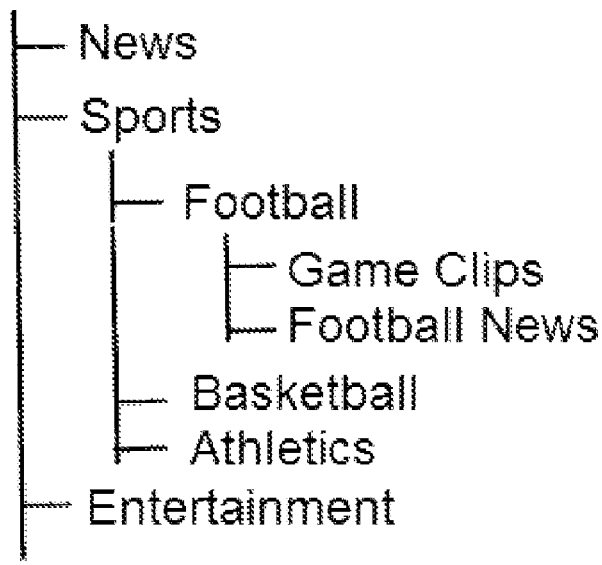
FIG. 4 is a schematic diagram illustrating a hierarchy of announcements.

Referring now to FIG. 4, an example of a hierarchy tree is shown. Here, a first (highest) level (DCO) is shown, with three categories (news, sport and entertainment) on a second level, which is lower than the first. Each of the categories on the second level includes various subcategories (on a third level), although only the subcategories of the sport category are shown, namely football, basketball and athletics. As can be seen, the football subcategory has two sessions associated with it, namely games and football news. Sessions are of the lowest level of the hierarchy. Operation of the user interface of the receiver of FIG. 2 will now be described with reference to FIGS. 4 and 5.

Figure 5A:
FIGS. 5A to 5C are schematic diagrams illustrating screen shots produced by a user interface forming part of the FIG. 2 receiver according to one aspect of the invention.
Figure 5B:
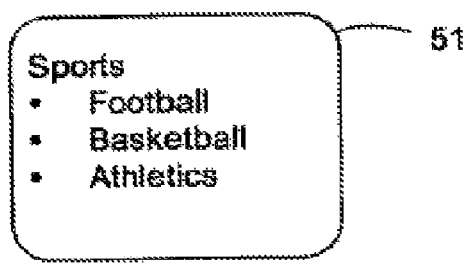

Referring firstly to FIG. 5A, the DVB receiver 35, forming part of the user interface, receives an announcement message, transmitted in respect of the first level, identifying, there to be three messages at the second level. These three messages relate to the same category, which in this case is 'information'. The first level announcement message received by the user interface also includes certain other information relating to them as is, described above in relation to the earlier Figures. The DVB receiver 35 then receives the three messages, as described above, and from the received messages obtains a title or label for each of them. The user interface in response displays a screenshot 50, which includes a number of options equal to the number of messages at the second level, and identifies each of them with its respective title or label.

In connection with the selection of the 'sports' option by a user, the user interface receives the three announcement messages which relates to the announcements in the category 'sports' and existing at the third level. These messages include information labels identifying the titles or labels of those three options, as well as the port and address where those messages can be received. Labels identifying those subcategories are then displayed as is shown by the screen shot 51 of FIG. 5B.

Figure 5C:
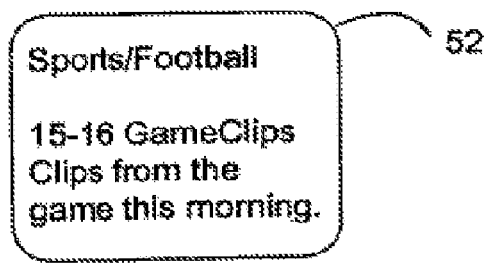

In connection with the selection of the 'football' option by a user, the user interface receives two session messages relating to that option, and information therefrom is displayed at the screen shot 52 of FIG. 5C. In this example, the screen shot 52 indicates that clips from the game that morning will be broadcast between 15:00 and 16:00. Optionally, the user interface may display other information also received as part of the announcement messages, such as further description of the broadcast, and/or the URL of a website where more information can be found.

In the foregoing, it will be appreciated that the terms 'higher level' and 'lower level' refer to announcements and the like which are connected with levels further up or down, respectively, the hierarchical structure.

What is claimed is:

1. A method of broadcasting or multicasting comprising:
   determining, at a processor, to broadcast or multicast one or more announcements on a lower level of a hierarchical structure of announcements, the one or more announcements relating to a category of an information service;
   determining, at the processor, to broadcast or multicast, on a higher level of the hierarchical structure of announcements, data indicating the category of the information service, and data indicating a quantity of the one or more announcements; and broadcasting or multicasting the one or more announcements and the data based on the determinations.

2. The method of claim 1, further comprising:

determining, at the processor, to broadcast or multicast on the lower level of the hierarchical structure of announcements, data indicating a transport format of a root level of the hierarchical structure of announcements.

3. The method of claim 1, further comprising:

determining, at the processor, to broadcast or multicast on the higher level, information identifying a location of access of the one or more announcements.

4. The method of claim 3, wherein the identifying information includes an internet protocol address and a port of the announcements.

5. The method of claim 1, wherein the one or more announcements are associated with a timeout value.

6. A method of broadcasting or multicasting comprising facilitating access to at least one interface configured to allow access to at least one service, the at least one service configured to perform at least the following:

determining, at a processor, to broadcast or multicast one or more announcements on a lower level of a hierarchical structure of announcements, the one or more announcements relating to a category of an information service;

determining, at the processor, to broadcast or multicast, on a higher level of the hierarchical structure of announcements, data indicating the category of information service, and data indicating a quantity of the one or more announcements; and broadcasting or multicasting the one or more announcements and data based on the determinations.

7. The method of claim 6, wherein the service is caused to further perform:

determining to broadcast or multicast, on the lower level of the hierarchical structure of announcements, data indicating a transport format of a root level of the hierarchical structure of announcements.

8. The method of claim 6, wherein the service is caused to further perform:

determining, at the processor, to broadcast or multicast, on the higher level, information identifying a location of access of the one or more announcements.

9. The method of claim 8, wherein the identifying information includes an internet protocol address and a port of the one or more announcements.

10. The method of claim 6, wherein the one or more announcements are associated with a timeout value.

11. An apparatus for broadcasting or multicasting comprising:

at least one processor; and at least one memory including computer program code, the at least one memory and the computer program code configured to, with the at least one processor, cause the apparatus to perform at least the following, determine to broadcast or multicast, one or more announcements on a lower level of a hierarchical structure of announcements, the one or more announcements relating to a category of an information service;

determine to broadcast or multicast, on a higher level of the hierarchical structure of announcements, data indicating the category, and data indicating a quantity of the one or more announcements; and broadcasting or multicasting the one or more announcements and data based on the determinations.

12. The apparatus of claim 11, wherein the apparatus is further caused to:

determine to broadcast or multicast, on the lower level of the hierarchical structure of announcements, data indicating a transport format of a root level of the hierarchical structure of announcements.

13. The apparatus of claim 11, wherein the apparatus is further caused to:

determine to broadcast or multicast, on the higher level, information identifying a location of access of the one or more announcements.

14. The apparatus of claim 13, wherein the identifying information includes an internet protocol address and a port of the one or more announcements.

15. The apparatus of claim 11, wherein the one or more announcements are associated with a timeout value.

16. A method of receiving announcements comprising:

receiving, at a processor, announcement data at a higher level in a hierarchical structure of announcement data indicating a category of an information service to which one or more announcements on a lower level of the hierarchical structure of announcement data belong;

receiving, at the processor, data indicating a quantity of the one or more announcements;

determining to receive the one or more announcements for a period of time dependent at least in part on the quantity data indicator; and receiving the one or more announcements for the period of time based on the determination.

17. The method of claim 16, further comprising:

receiving, on the lower level of the hierarchical structure of announcement data, data indicating a transport format of a root level of the hierarchical structure of announcement data.

18. The method of claim 16, further comprising:

receiving, on the higher level, information identifying a location of access of the one or more announcements; and determining to receive the one or more announcements from the location.

19. The method of claim 18, wherein the identifying information includes an internet protocol address and a port of the announcements.

20. The method of claim 16, wherein the one or more announcements are associated with a timeout value and wherein the processor is caused to cease receiving the one or more announcements for a period of time dependent on the timeout value.

21. A non-transitory computer-readable storage medium carrying one or more sequences of one or more instructions for receiving announcements which, when executed by one or more processors, cause an apparatus to at least perform the following steps:

receiving announcement data at a higher level in a hierarchical structure of announcement data indicating a category of an information service to which one or more announcements on a lower level of the hierarchical structure of announcement data belong;

receiving data indicating a quantity of the one or more announcements;

determining to receive the one or more announcements for a period of time dependent at least in part on the quantity data indicator; and receiving the one or more announcements for the period of time based on the determination.

22. The non-transitory computer-readable storage medium of claim 21, wherein the apparatus is further caused to perform:
receiving on the lower level of the hierarchical structure of announcement data, data indicating a transport format of a root level of the hierarchical structure of announcement data.

23. The non-transitory computer-readable storage medium of claim 21, wherein the apparatus is further caused to perform:
receiving, on the higher level, information identifying a location of access of the one or more announcements; and
determining to receive the one or more announcements from the location.

24. The non-transitory computer-readable storage medium of claim 23, wherein the identifying information includes an internet protocol address and a port of the announcements.

25. The non-transitory computer-readable storage medium of claim 21, wherein the one or more announcements are associated with a timeout value, and wherein the apparatus is caused to cease receiving the one or more announcements for a period of time dependent on the timeout value.

26. An apparatus for receiving announcements comprising:
at least one processor; and
at least one memory including computer program code,
the at least one memory and the computer program code configured to, with the at least one processor, cause the apparatus to perform at least the following,
receive announcement data at a higher level in a hierarchical structure of announcement data indicating a category of an information service to which one or more announcements on a lower level of the hierarchical structure of announcement data belong;
receive data indicating a quantity of the one or more announcements;
determine to receive the one or more announcements for a period of time dependent at least in part on the quantity data indicator; and
receive the one or more announcements for the period of time based on the determination.

27. The apparatus of claim 26, wherein the apparatus is further caused to:
receive, on the lower level of the hierarchical structure of announcement data, data indicating a transport format of a root level of the hierarchical structure of announcement data.

28. The apparatus of claim 26, wherein the apparatus is further caused to:
receive, on the higher level, information identifying a location of access of the one or more announcements; and
determine to receive the one or more announcements from the location.

29. The apparatus of claim 28, wherein the identifying information includes an internet protocol address and a port of the announcements.

30. The apparatus of claim 26, wherein the one or more announcements are associated with a timeout value and wherein the apparatus is further caused to cease receiving the one or more announcements for a period of time dependent on the timeout value.

* * * * *